United States Patent [19]
Yokoya et al.

[11] Patent Number: 5,090,728
[45] Date of Patent: Feb. 25, 1992

[54] APPARATUS FOR CONTROLLING DAMPING FORCE OF SHOCK ABSORBER

[75] Inventors: Yuji Yokoya, Toyota; Yasuhiro Tsutsumi, Susono; Yutaka Suzuki, Nishio; Makoto Shiozaki, Kariya; Nobuyoshi Onogi, Nagoya; Kazuo Takasou, Oobu, all of Japan

[73] Assignee: Toyota Jidosha Kabushiki Kaisha, Toyota, Japan

[21] Appl. No.: 654,102

[22] Filed: Feb. 12, 1991

[30] Foreign Application Priority Data
Feb. 14, 1990 [JP] Japan .................. 2-33366

[51] Int. Cl.$^5$ .............................. B60G 11/26
[52] U.S. Cl. .................. 280/707; 280/709; 364/424.05
[58] Field of Search .......... 280/693, 698, 707, 709; 364/424.05

[56] References Cited

U.S. PATENT DOCUMENTS

| | | | |
|---|---|---|---|
| 4,852,906 | 8/1989 | Buma et al. | 280/707 |
| 4,887,699 | 12/1989 | Ivers et al. | 280/707 |
| 4,984,820 | 1/1991 | Uchiyama et al. | 280/707 |
| 5,016,910 | 5/1991 | Nagai | 280/707 |

FOREIGN PATENT DOCUMENTS

| | | | |
|---|---|---|---|
| 3719544 | 12/1987 | Fed. Rep. of Germany | 280/707 |
| 0188212 | 8/1986 | Japan | 280/707 |
| 0263815 | 11/1986 | Japan | 280/707 |
| 63-6238 | 1/1988 | Japan . | |
| 0106720 | 4/1989 | Japan | 280/707 |
| 0020412 | 1/1990 | Japan | 280/707 |

Primary Examiner—Charles A. Marmor
Assistant Examiner—Tamara L. Finlay
Attorney, Agent, or Firm—Cushman, Darby & Cushman

[57] ABSTRACT

An apparatus for controlling a damping force of a shock absorber provided between a wheel of a vehicle and a body thereof includes a road surface condition detecting unit for detecting a roughness of a road surface on which the vehicle is traveling, and a damping force characteristic alteration unit for altering the setting of the damping force of the shock absorber on the basis of the roughness of the road surface detected by the road surface condition detecting unit. The apparatus also includes a damping force detecting unit, for detecting a magnitude of the damping force of the shock absorber, and an alteration speed control unit for controlling, on the basis of the magnitude of the damping force detected by the damping force detecting unit, an alteration speed at which the setting of the damping force is altered so that the alteration speed decreases as the magnitude of the damping force increases.

16 Claims, 13 Drawing Sheets

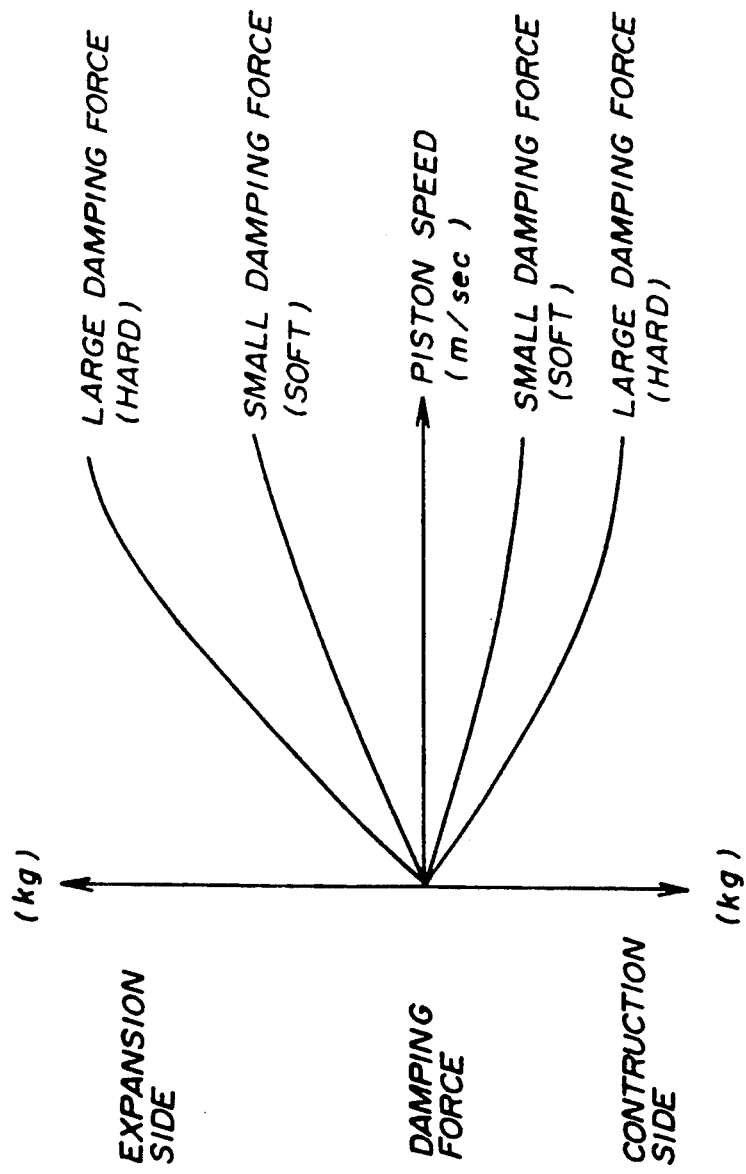

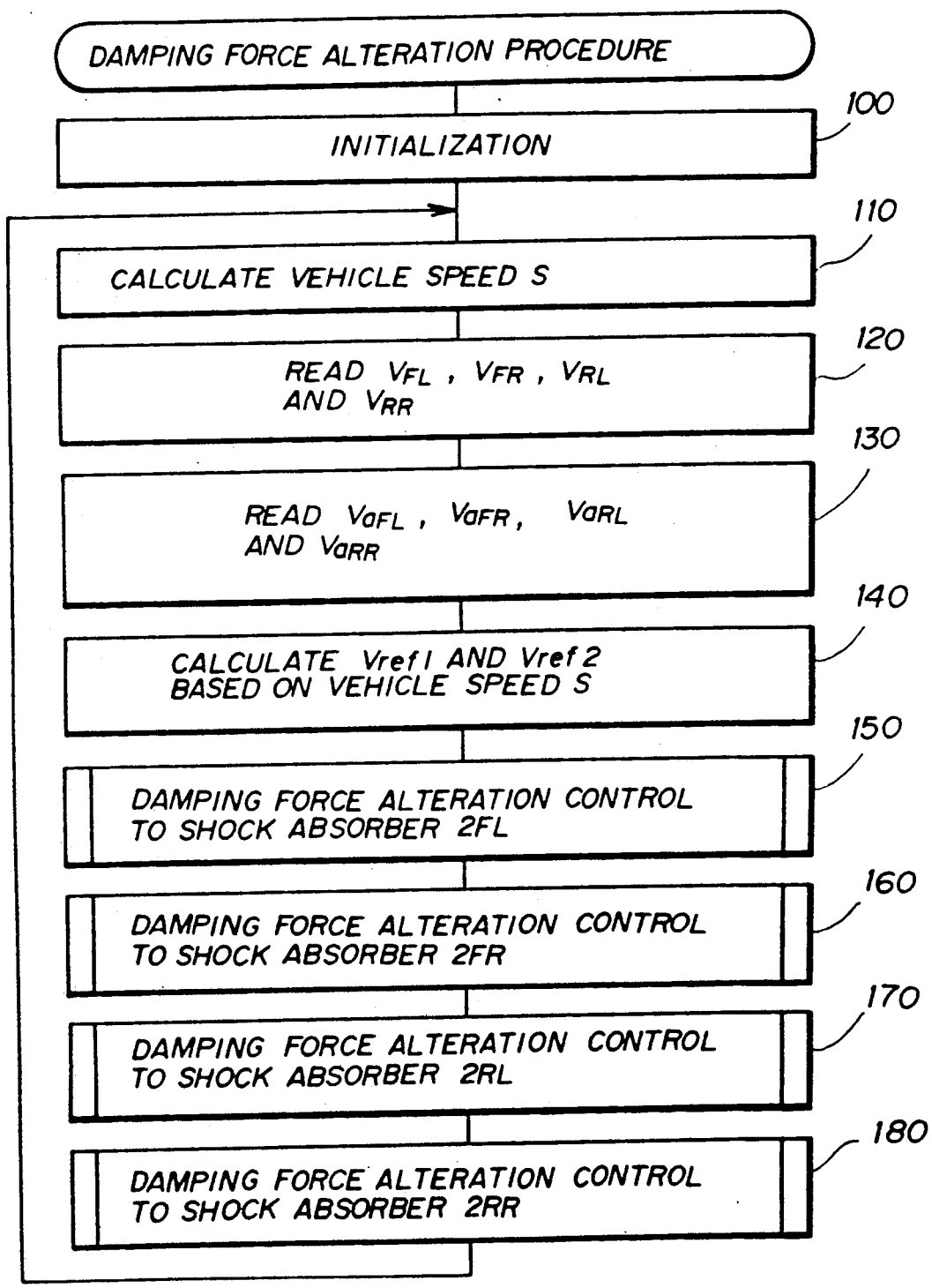

APPARATUS FOR CONTROLLING DAMPING FORCE OF SHOCK ABSORBER

BACKGROUND OF THE INVENTION (1) Field of the Invention

The present invention generally relates to a suspension system, and more particularly to an apparatus for controlling the damping force of a shock absorber provided in a suspension system of an automotive vehicle on the basis of the condition of a road surface.

(2) Description of the Prior Arts

There is previously known an apparatus for controlling the damping force of a shock absorber in order to improve riding comfort obtained when the vehicle is traveling. Such an apparatus detects the condition of a road surface on which the vehicle is traveling, and alters the setting of the damping force from a high level (hard state) to a low level (soft state) or vice versa on the basis of a roughness of the road surface.

A conventional damping force control apparatus uses an ultrasonic sensor which senses a roughness of the road surface. Another conventional damping force control apparatus disclosed in Japanese Laid-Open patent application No. 62-221907 judges whether or not the road surface is rough by detecting the expanding/contracting acceleration of the shock absorber. Still another conventional damping force control apparatus disclosed in Japanese Laid-Open patent application No. 63-6238 judges whether or not the road surface is rough by detecting the damping force of the shock absorber.

In conventional damping force control apparatus as described above, when a predetermined condition for altering the setting of the damping force is satisfied, the setting of the damping force of the shock absorber is altered at a maximum operating speed of a damping force alteration mechanism in order to rapidly alter the setting of the damping force. Thus, when the setting of the damping force is altered while the damping force is maintained in the high (hard) level, the damping force is rapidly changed, so that a shock due to the rapid switching of the damping force occurs. The occurrence of such a shock causes the driver or passengers to feel uncomfortable.

In order to eliminate the above-mentioned problem, it may be possible to alter the setting of the damping force at a decreased speed. However, the response characteristic of the shock absorber will deteriorate if the setting of the damping force is simply altered at a low speed. For example, the setting of the damping force will not be altered rapidly in such a case that no shock substantially takes place (that is, in the case where the damping force is maintained at the low (soft) level).

SUMMARY OF THE INVENTION

It is a general object of the present invention to provide an improved apparatus for controlling the damping force of the shock absorber in which the aforementioned disadvantages are eliminated.

A more specific object of the present invention is to provide an apparatus for controlling the damping force of the shock absorber capable of preventing the occurrence of a shock resulting from the switching of the setting of the damping force without deteriorating the response characteristic of the shock absorber.

The above-mentioned objects of the present invention are achieved by an apparatus for controlling a damping force of a shock absorber provided between a wheel of a vehicle and a body thereof, the shock absorber having at least two different setting characteristics of the damping force, the apparatus comprising:

road surface condition detecting means for detecting a roughness of a road surface on which the vehicle is traveling;

damping force characteristic alteration means, coupled to the road surface condition detecting means, for altering the setting of the damping force of the shock absorber on the basis of the roughness of the road surface detected by the road surface condition detecting means;

damping force detecting means, coupled to the shock absorber, for detecting a magnitude of the damping force of the shock absorber; and alteration speed control means, coupled to the damping force characteristic alteration means and the damping force detecting means, for controlling, on the basis of the magnitude of the damping force detected by the damping force detecting means, an alteration speed at which the setting of the damping force is altered so that the alteration speed decreases as the magnitude of the damping force increases.

BRIEF DESCRIPTION OF THE DRAWINGS

Other objects, features and advantages of the present invention will become more apparent from the following detailed description when read in conjunction with the accompanying drawing, in which:

FIG. 4 is a graph illustrating a damping force characteristic of the variable damping force type shock absorber shown in FIG. 3A;

FIGS. 9A and 9B are flowcharts illustrating the damping force alteration control;

DESCRIPTION OF THE PREFERRED EMBODIMENTS

Figure 1:
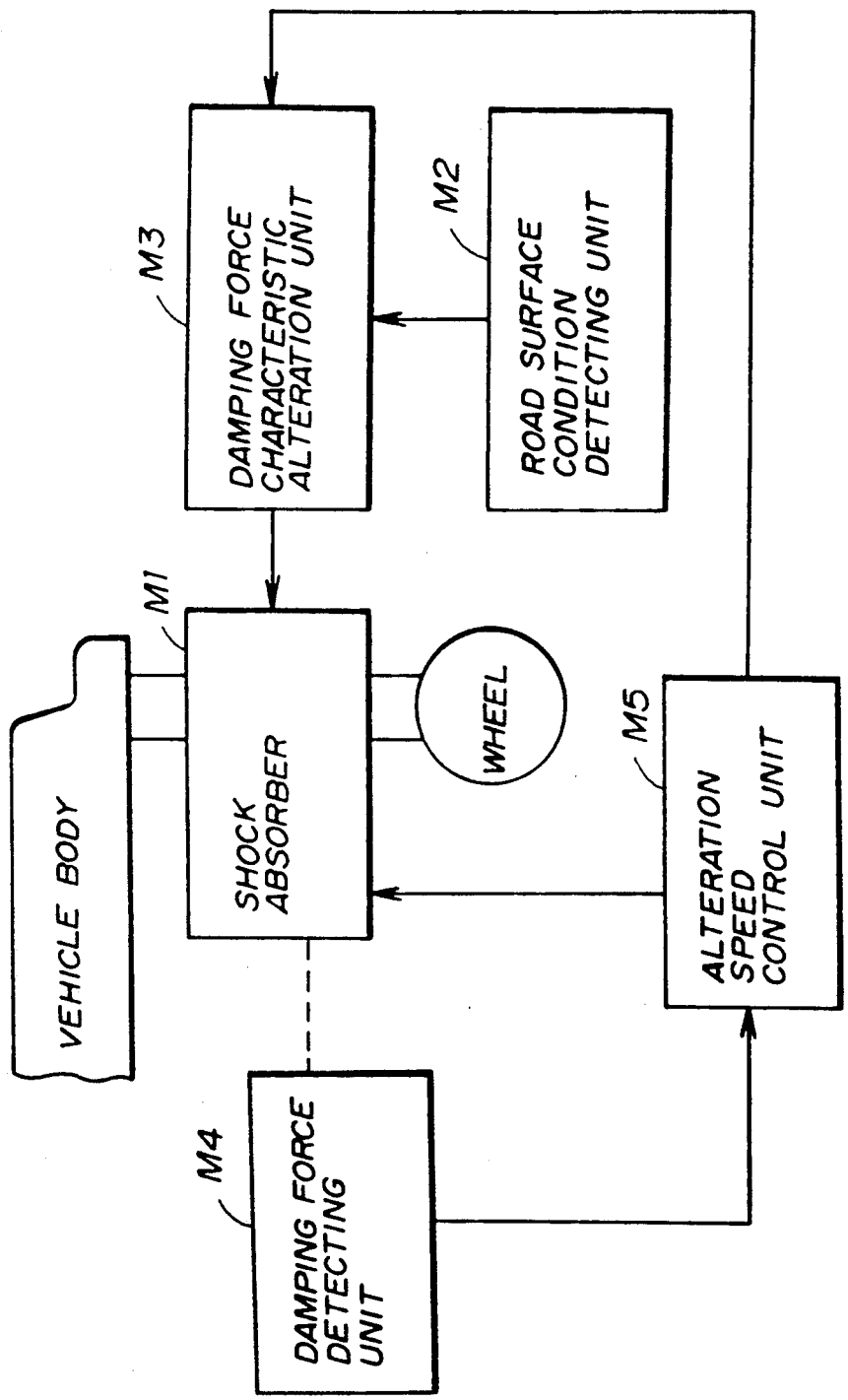
FIG. 1 is a block diagram illustrating the outline of the present invention.

Referring to FIG. 1, there is illustrated the outline of an apparatus for controlling the damping force of a shock absorber according to a preferred embodiment of the present invention. The apparatus shown in FIG. 1 is composed of a road surface condition detecting unit M2, a damping force characteristic alteration unit M3, a damping force detecting unit M4 and an alteration speed control unit M5.

A shock absorber M1 is provided between a wheel of a vehicle and a body of the vehicle, and has at least two setting levels of the damping force (hard state and soft state). The road surface condition detecting unit M2 detects a roughness of a road surface on which the vehicle is traveling. That is, the road surface condition detecting unit M2 judges whether or not the road surface on which the vehicle is traveling is rough. The damping force characteristic alteration unit M3 alters the characteristic (setting) of the damping force of the shock absorber M1 on the basis of the roughness of the road surface detected by the road surface condition detecting unit M2. The damping force detecting unit M4 detects the magnitude of the damping force of the shock absorber M1. The alteration speed control unit M5 controls the alteration speed of the setting of the damping force on the basis of the magnitude of the damping force detected by the damping force detecting unit M4 so that the alteration speed decreases as the damping force increases. More specifically, the setting of the damping force of the shock absorber M1 is altered at a low alteration speed (slowly) when the damping force of the shock absorber M1 is maintained at a high level (hard state) and thus changes greatly due to the switching of the setting of the damping force. On the other hand, the setting of the damping force is altered at a high speed when the damping force of the shock absorber M1 is maintained at a low level (soft state) and thus changes slightly due to the switching of the setting of the damping force.

A description will now be given of the apparatus according to the preferred embodiment of the present invention in more detail.

Figure 2:
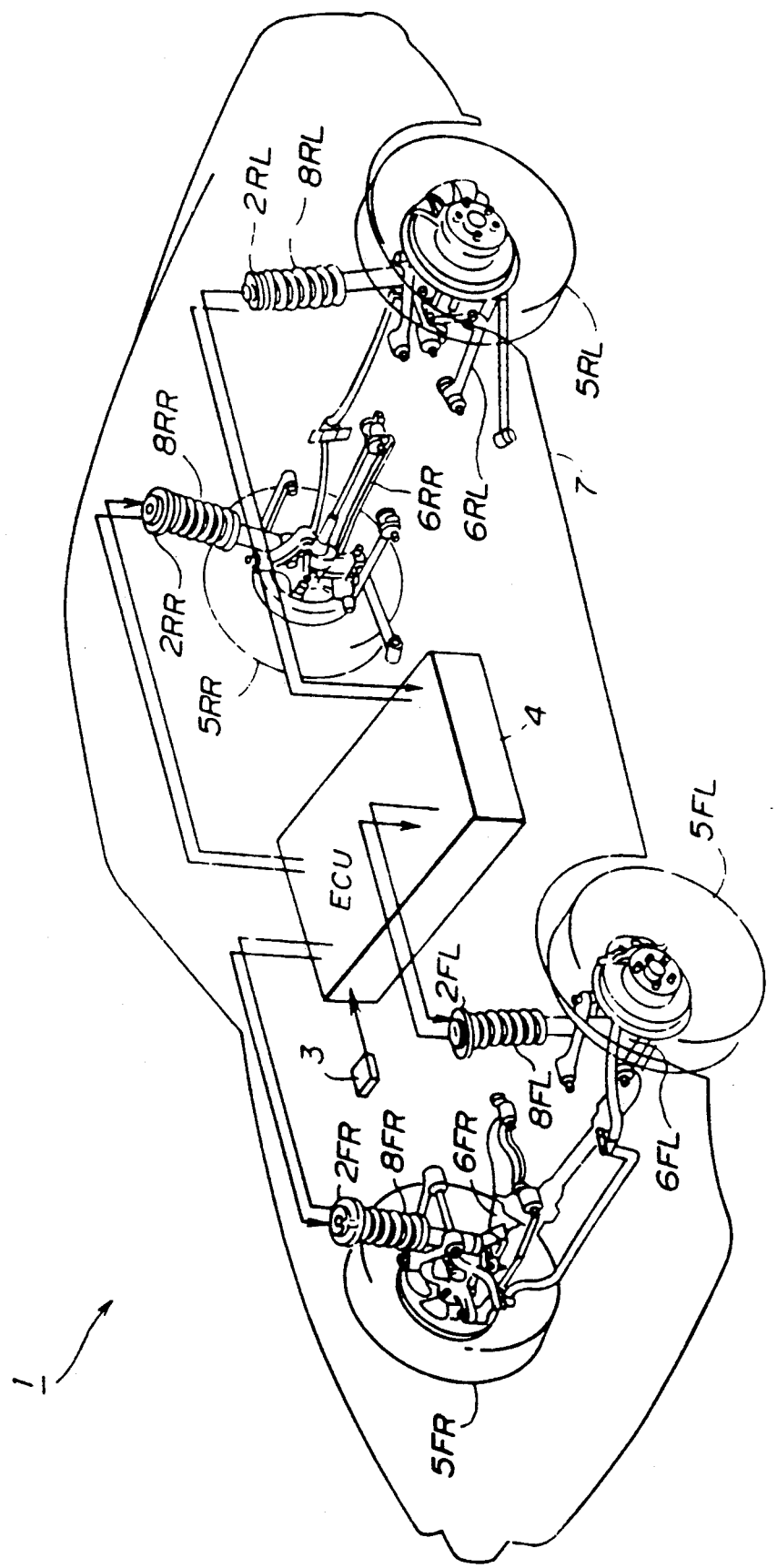
FIG. 2 is a perspective view of a vehicle which has a damping force control apparatus according to a preferred embodiment of the present invention.

Referring to FIG. 2, there is illustrated the entire structure of an automotive vehicle 1 having an apparatus for controlling the damping force of each shock absorber according to the preferred embodiment of the present invention. The vehicle 1 has four variable damping force type shock absorbers 2FL, 2FR, 2RL and 2RR (hereafter simply referred to as shock absorbers). The damping force control apparatus has a vehicle speed sensor 3 and an electronic control unit (hereafter simply referred to as an ECU) 4.

The shock absorbers 2FL, 2FR, 2RL and 2RR respectively have piezoelectric load sensors which sense the damping forces exerted on the shock absorbers 2FL, 2FR, 2RL and 2RR, and piezoelectric actuators for switching the setting of the damping forces between a high level (hard state) and a low level (soft state). The shock absorbers 2FL, 2FR, 2RL and 2RR are respectively provided, together with coil springs 8FL, 8FR, 8RL and 8RR, between a vehicle 7 and suspension lower arms 6FL, 6FR, 6RL and 6RR of a left front wheel 5FL, a right front wheel 5FR, a left rear wheel 5RL and a right rear wheel 5RR. On the other hand, a detection signal from the vehicle speed sensor 3 is input to the ECU 4, which outputs controls signals to the above-mentioned piezoelectric actuators.

A description will now be given of the structures of the shock absorbers 2FL, 2FR, 2RL and 2RR. Since the shock absorbers 2FL, 2FR, 2RL and 2RR have the same structures, only the shock absorber 2FL provided for the left front wheel 5FL will be explained.

Figure 3A:
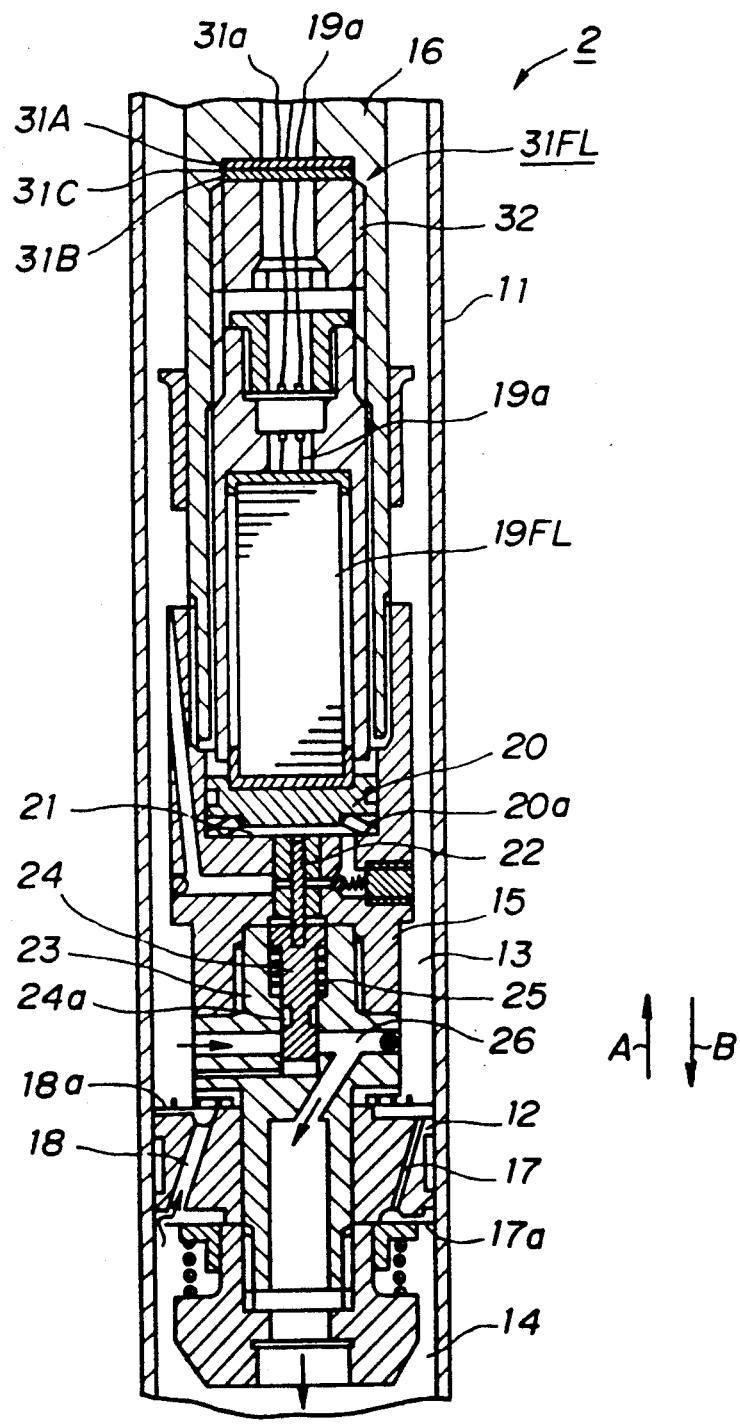
FIG. 3A is a partial cross-sectional view of a variable damping force type shock absorber.

FIG. 3A illustrates the structure of the shock absorber 2FL. The shock absorber 2FL has a cylinder 11. A main piston 12 engages with an inner wall of the cylinder 11 so that the main piston 12 can slide in the cylinder 11 in the axial directions indicated by arrows A and B. The inner area of the cylinder 11 is divided into a first fluid room 13 and a second fluid room 14 by the main piston 12. The main piston 12 is connected to one end of a piston rod 15, which has the other end fixed to a shaft 16. A lower portion (not shown for the sake of simplicity) of the shaft 11 is connected to the lower arm 6FL for the left front wheel 5FL, and an upper portion (also not shown for the sake of simplicity) of the shaft 11 is connected to the vehicle body 7.

The main piston 12 has an expansion side fixed orifice 17 and a contraction side fixed orifice 18. The fixed orifices 17 and 18 respectively connect the first fluid room 13 and the second fluid room 14 to each other. A plate valve 17a which limits the flow of actuating oil to one direction is provided on an outlet port side of the expansion side fixed orifice 17. Similarly, a plate valve 18a which limits the flow of actuating oil to one direction is provided on an outlet port side of the contraction side fixed orifice 18.

When the main piston 12 slides in the cylinder 11 in the direction A or B, the actuating oil in the first fluid room 13 flows to the second fluid room 14 through the expansion side fixed orifice 17, and the actuating oil in the second fluid room 14 flows to the first fluid room 13 through the contraction side fixed orifice 18. The damping force of the shock absorber 2FL is based on the cross section of a passage of the actuating oil, as will be described later.

The piston rod 15 has a central hollow portion in which a piezoelectric actuator 19FL is provided. The piezoelectric actuator 19FL is formed of a member in which electrostriction elements are stacked. More specifically, thin plates formed of piezoelectric ceramics are layered through electrodes. In other words, one electrode is sandwiched between two adjacent third plates. A lead 19a provided in a passage extending in the shaft 16 in the axial direction is connected to the electrodes. A piston 20 is provided at a position close to a lower end surface of the piezoelectric actuator 19FL. Normally, the piston 20 is urged in the direction A by a leaf spring 20a. The piston 20 is slidable in the central hollow portion of the piston rod in the directions A and B.

When a voltage equal to, for example, 600 volts is applied to the piezoelectric actuator 19FL via the lead 19a, the piezoelectric actuator 19FL expands, and the piston 20 moves a distance between, for example, 10 $\mu$m and 100 $\mu$m in the direction B. On the other hand, when a voltage equal to, for example, a ground potential is applied to the piezoelectric actuator 19FL via the lead 19a, it is discharged and thus contracts. Thus, the piston 20 is moved in the direction A due to the force of the leaf spring 20a.

The central hollow portion of the piston rod 15 and a bottom surface of the piston 20 form an oil sealing room 21. A column-shaped plunger 22 is slidably provided in a through hole provided in the piston rod 15. The through hole extends in the axial direction and has one end which faces a bottom portion of the oil sealing room 21. That is, an upper end of the plunger 22 faces the bottom portion of the oil sealing room 21. A lower end of the plunger 22 engages with an upper portion of a spool valve 24, which slidably engages with an engagement hole provided in a housing 23 fixed to the piston rod 15.

The spool valve 24 is urged in the direction A by a spring 25. A ring-shaped groove 24a is formed in a lower portion of the spool valve 24, which has a lowermost portion shaped into a column. Further, a sub fluid passage 26 which connects the first fluid room 13 and the second fluid room 14 to each other is provided in the piston rod 15. Normally, the sub fluid passage 26 is interrupted by the lowermost portion of the spool valve 24 urged in the direction A by the spring 25, so that the sub fluid passage 26 is divided into two passage portions.

Figure 3B:
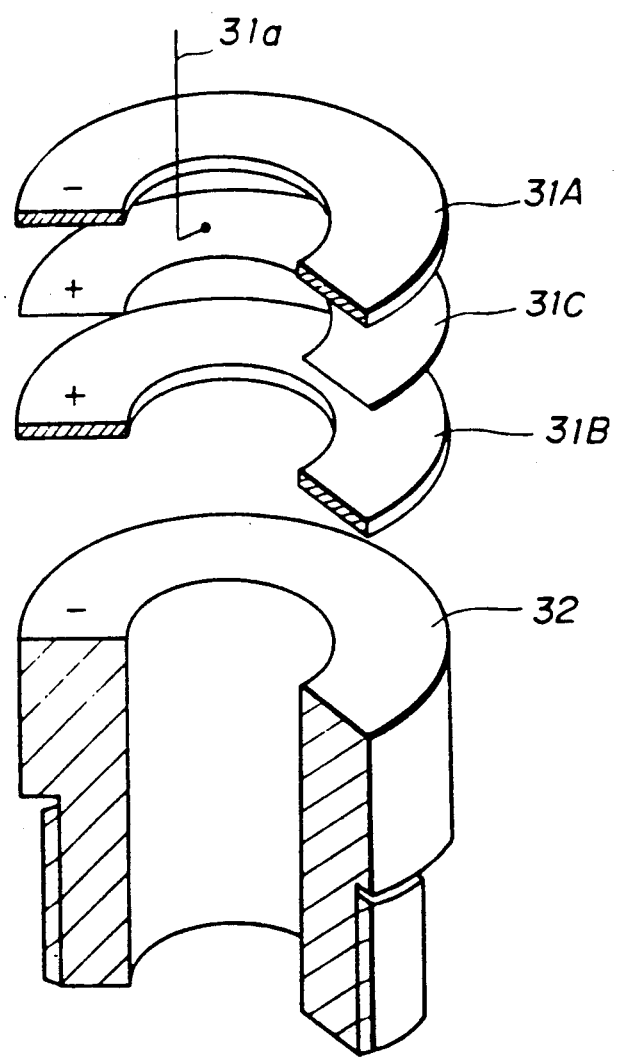
FIG. 3B is an exploded perspective view of a piezoelectric load sensor provided in the variable damping force type shock absorber shown in FIG. 3A.

When a voltage equal to, for example, 600 volts is applied to the piezoelectric actuator 19FL, it expands and causes the piston 20 to move in the direction B. Thus, the pressure in the oil sealing room 21 increases, so that the plunger 22 and the spool valve 24 move in the direction B. Thus, the divided passage portions of the sub fluid passage 26 are connected to each other via the ring-shaped groove 24a formed in the circumferential outer surface of the lower portion of the spool valve 24. As a result, the first fluid room 13 and the second fluid room 14 are mutually connected via the sub fluid passage 26. Thus, the cross section of the actuating oil which passes through the main piston 12 increases, so that the amount of the actuating oil passing through the main piston 12 substantially increases. As a result, the damping force of the shock absorber 2FL decreases. That is, the setting of the damping force is altered to the low level (soft state) from the high level (hard state). It should be noted that normally, the setting of the damping force is maintained in the high level. FIG. 4 is a graph showing the relationship between the damping force and a piston speed (m/sec).

a piezoelectric load sensor 31FL, which senses the magnitude of the damping force exerted on the shock absorber 2FL, is provided on an upper portion of the shaft 16. More specifically, the piezoelectric load sensor 31FL is fixed to the shaft 16 by a nut 32. As shown in FIG. 3B, the piezoelectric load sensor 31FL has an electrode 31C sandwiched between two piezoelectric thin plates 31A and 31B formed of piezoelectric ceramics such as PZT. The electrode 31C is connected to the ECU 4 via a lead 31a.

Figure 5:
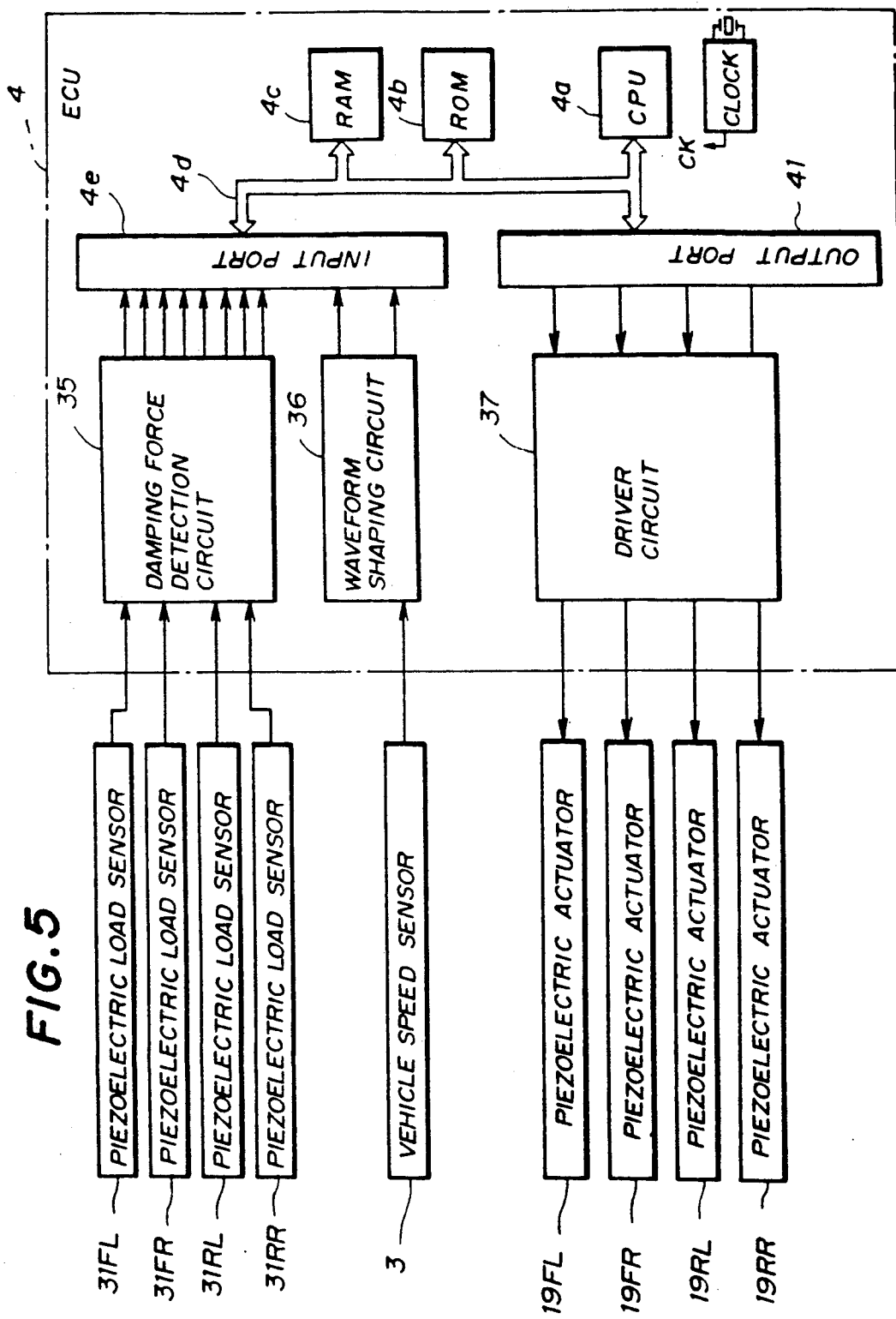
FIG. 5 is a block diagram of an electronic control unit used in the embodiment of the present invention.

The ECU 4 has a configuration as shown in FIG. 5. The ECU 4 has a central processing unit (CPU) 4a, a read only memory (ROM) 4b and a random access memory (RAM) 4c, which form a logic operation circuit. The CPU 4a, the ROM 4b and the RAM 4c are connected to an input port (interface) 4e and an output port (interface) 4f via a common bus 4d. Further, the ECU 4 has a damping force detection circuit 35, a waveform shaping circuit 36 and a driver circuit 37. The damping force detection circuit 35 is provided between the piezoelectric load sensors 31FL, 31FR, 31RL and 31RR and the input port 4e. The damping force detection circuit 35 respectively detects, from the charges generated by the piezoelectric load sensors 31FL, 31FR, 31RL and 31RR, the damping forces of the shock absorbers 2FL, 2FR, 2RL and 2RR as well as the rates of change of the damping forces thereof. The waveform shaping circuit 36 receives a detection signal generated and output by the vehicle speed sensor 3, and shapes it into an appropriate waveform suitable for digital processing. Output signals of the damping force detection circuit 35 and the waveform shaping circuit 36 are input to the input port 4e.

The driver circuit 37 is provided between the output port 4f and the piezoelectric load sensors 19FL, 19FR, 19RL and 19RR. The driver circuit 37 receives, via the output port 4f, control signals (corresponding to instruction voltages Vs which will be described later) indicative of target charge amounts which are related to the piezoelectric actuators 19FL, 19FR, 19RL and 19RR and which are output by the CPU 4a. Then, the driver circuit 37 generates signals which are actually applied to the piezoelectric actuators 19FL, 19FR, 19RL and 19RR. When such signals are applied to the piezoelectric actuators 19FL, 19FR, 19RL and 19RR, they expand, so that the setting of the damping forces of the shock absorbers 2FL, 2FR, 2RL and 2RR are altered to the low level.

Figure 6:
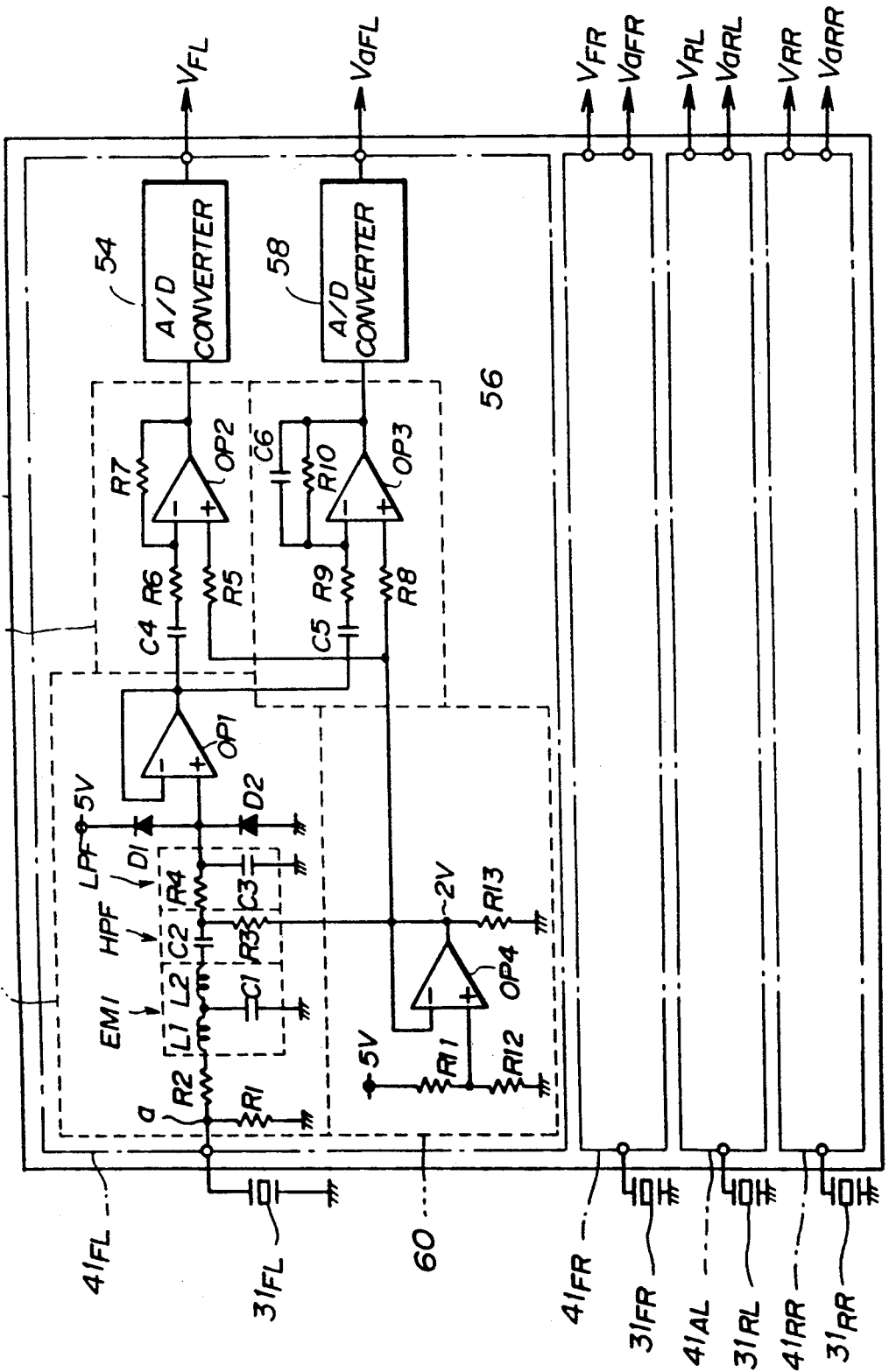
FIG. 6 is a circuit diagram of a damping force detection circuit shown in FIG. 5.

As shown in FIG. 6, the damping force detection circuit 35 has four detection circuits 41FL, 41FR, 41RL and 41RR provided respectively for the piezoelectric load sensors 31FL, 31FR, 31RL and 31RR. A description will now be given of the detection circuit 41FL. It will be noted that the other detection circuits 41FR, 41RL and 41RR operate in the same way as the detection circuit 41FL.

The detection circuit 41FL is composed of a damping force change rate detecting circuit 50, a damping force change rate signal amplifying circuit 52, an analog-to-digital (A/D) converter 54, a damping force estimating circuit 56, an A/D converter 58 and a voltage generating circuit 60. The damping force change rate detecting circuit 50 detects the damping force change rate from a current passing through the piezoelectric load sensor 31FL, and generates a damping force change rate signal which indicates the detected damping force change rate. The damping force change rate signal amplifying circuit 52 amplifies the damping force change rate signal generated and output by the damping force change rate detecting circuit 50, and outputs an amplified damping force change rate signal. The A/D converter 54 converts the amplified damping force change rate signal in analog form into a corresponding digital signal. The damping force estimating circuit 56 estimates the magnitude of the damping force by integrating the damping force change rate signal from the damping force change rate detecting circuit 50, and outputs a damping force signal indicating the estimated magnitude of the damping force. The A/D converter 58 converts the damping force signal in analog signal into a corresponding digital signal. The voltage generating circuit 60 generates a reference voltage approximately equal to 2 volts.

The damping force change rate detecting circuit 50 has a resistor R1 connected to the piezoelectric load sensor 31FL in parallel form. A change based on the damping force by expansion or contraction of the shock absorber 2FL is developed across the piezoelectric load sensor 31FL. A current based on the above charge passes through the resistor R1. That is, a current passes through the resistor R1 each time the damping force is changed and thus a charge is generated in the piezoelectric load sensor 31FL. The amount of this current indicates the damping force change rate. The current passing through the resistor R1 is converted into a voltage by the resistor R1. That is, a voltage developed across the resistor R1 indicates the damping force change rate related to the shock absorber 2FL.

The voltage developed across the resistor R1 is applied to a radio wave noise elimination filter EMI of the damping force change rate detecting circuit 50 via a resistor R2. The noise elimination filter EMI is composed of two coils L1 and L2, and a capacitor C1, and eliminates high-frequency components, such as radio wave noise, from the voltage signal applied thereto. A voltage signal obtained by eliminating the high-frequency components is applied to a highpass filter HPF, which has a capacitor C2 and a resistor R3. More specifically, the voltage signal from the noise elimination filter EMI is applied to the capacitor C2, and the reference voltage equal to 2 volts is applied to the resistor R3. The highpass filter HPF eliminates low-frequency components having the frequencies equal to or lower than 0.1 Hz from the voltage signal from the noise elimination filter EMI. At the same time, the voltage signal from the noise elimination filter EMI is increased by 2 volts. An output signal of the highpass filter HPF is applied to a lowpass filter LPF, which has a resistor R4 and a capacitor C3. The lowpass filter LPF eliminates high-frequency components having the frequencies equal to or higher than 100 Hz from the signal from the highpass filter HPF. An output signal passes through a buffer circuit formed of an operational amplifier OP1, and then output to the damping force change rate signal amplifying circuit 52 and the damping force estimating circuit 56. A series circuit consisting of diodes D1 and D2 is connected between a high-potential side power source having a voltage of 5 volts and a low-potential side power source having a voltage equal to the ground level. The diodes D1 and D2 are provided for protecting the operational amplifier OP1 so that the input voltage applied to the non-inverting input terminal of the operational amplifier OP1 is maintained between 0 volt and 5 volts.

The operation of the damping force change rate detecting circuit 50 will be described below with reference to FIG. 7. FIG. 7(A) shows a road surface having a projection. When the left front wheel 5FL runs on the projection and thus the shock absorber 2FL contracts, the voltage developed across the resistor R1 (potential at a node 'a' shown in FIG. 6 with respect to the ground level) changes on the basis of an expansion/contraction acceleration, as shown in FIG. 7(B). The voltage shown in FIG. 7(B) is processed by the filters EMI, HPF and LPF, and passes through the operational circuit OP1. Thereby, a voltage signal which has frequencies between 0.1 Hz and 100 Hz and which is 2 volts higher than the voltage signal obtained at the node "a" is output, as the aforementioned damping force change rate signal, from the damping force change rate detecting circuit 50, as shown in FIG. 7(C).

It will be noted that an arrangement in which the voltage signal having the frequencies between 0.1 Hz and 100 Hz is extracted from the voltage signal at the node 'a', is used due to the fact that the shock absorber 2FL expands and contracts in this frequency range due to the structure of the shock absorber 2FL.

The damping force change rate signal amplifying circuit 52 amplifies the damping force change rate signal generated and output by the damping force change rate detecting circuit 50, and outputs the amplified signal to the A/D converter 54. As shown in FIG. 6, the damping force change rate signal amplifying circuit 52 is composed of a capacitor C4, three resistors R5, R6 and R7, and an operational amplifier OP2. The 2 V reference voltage generated by the voltage generating circuit 60 is applied to the non-inverting input terminal of the operational amplifier OP2 via the resistor R5. The output terminal of the operational amplifier OP1 of the damping force change rate detecting circuit 50 is coupled to the inverting input terminal of the operational amplifier OP2 via the capacitor C4 and the resistor R6 connected in series. The resistor R7 is connected between the inverting input terminal and output terminal of the operational amplifier OP2. As shown in FIG. 7(D), the damping force change rate signal amplifying circuit 52 outputs a damping force change rate signal $V_{FL}$, which is an amplified inverted version of the signal generated and output by the damping force change rate detecting circuit 50 and which has a center voltage equal to 2 volts.

It will be noted that the damping force change rate signal amplifying circuit 52 also functions as a highpass filter due to the existence of the capacitor C4 and the resistor R7, and eliminates the low-frequency components having the frequencies between a few heltz and 10 Hz from the signal generated and output by the damping force change rate detecting circuit 50.

The damping force change rate signal $V_{FL}$ generated and output by the damping force change rate signal amplifying signal 52 is used for altering the setting of the damping force of the shock absorber 2FL to the soft state when it is determined that the vehicle is traveling on a rough road surface. If the damping force change rate signal $V_{FL}$ has the low-frequency components having the frequencies between a few heltz and 10 Hz, the setting of the damping force will be altered to the soft state due to the existence of a small projection on the road surface. In this case, the vehicle body 7 will resonate with the roughness of the road surface, which deteriorates riding comfort.

The damping force estimating circuit 56 integrates the damping force change rate signal output by the damping force change rate detecting circuit 50, and generates the damping force signal which indicates the magnitude of the damping force. The damping force estimating circuit 56 has two capacitors C5 and C6, three resistors R8, R9 and R10, and an operational amplifier OP3. The 2 V reference voltage generated and output by the voltage generating circuit 60 is applied to the non-inverting input terminal of the operational amplifier OP3 via the resistor R8. The output terminal of the operational amplifier OP1 of the damping force change rate detecting circuit 50 is coupled to the inverting input terminal of the operational amplifier OP3 via the capacitor C5 and the resistor R9 connected in series. A parallel circuit consisting of the capacitor C6 and the resistor R10 is connected between the inverting input terminal and output terminal of the operational amplifier OP3.

The damping force estimating circuit 56 functions as a bandpass filter having a bandpass range between 1 Hz and 10 Hz. A direct current component of the damping force change rate signal output by the damping force change rate detecting circuit 50 is eliminated by the capacitor C5, and the remaining altering current components are integrated by an integration circuit composed of the capacitor C6 and the resistor R9. The output signal of the damping force estimating circuit 56 which indicates the estimated magnitude of the damping force is applied to the A/D converter 58. The output signal of the damping force estimating circuit 56 has a waveform, as shown in FIG. 7(E). The output signal of the damping force estimating circuit 56, which is the damping force signal now labeled $V_{aFL}$, is obtained by integrating the components having the frequencies between 0.1 Hz and 10 Hz of the damping force change rate signal output by the damping force change rate detecting circuit 50.

It should be noted that an arrangement in which only the frequency components having the frequencies between 0.1 Hz and 10 Hz are integrated in the damping force estimating circuit 56 is due to the fact that it is sufficient to detect only the low-frequency components which cause the vibration of the vehicle body 7 since the switching of the damping force setting from the low level to the high level is varied out by using the damping force signal output by the damping force estimating circuit 56, as will be described later.

As has been described previously, the voltage generating circuit 60 generates the reference voltage equal to 2 volts. As shown in FIG. 6, the voltage generating circuit 60 is composed of three resistors R11, R12 and R13, and an operational amplifier OP4. The voltage equal to 5 volts is divided by a series circuit consisting of the resistors R11 and R12. A voltage developed across the resistor R12 is applied to the non-inverting input terminal of the operational amplifier OP4. The output terminal of the operational amplifier OP4 is directly connected to the inverting input terminal thereof, and grounded via the resistor R13. The potential of the output terminal of the operational amplifier OP4 is fixed at 2 volts.

It will be noted that each of the detection circuits 41FR, 41RL and 41RR has the same configuration as the above-mentioned detection circuit 41FL. Each of the detection circuits 41FL, 41FR, 41RL and 41RR respectively outputs the damping force signal indicative of the magnitude of the damping force of the corresponding shock absorber, and the damping force change rate signal indicative of the damping force change rate related hereto.

It should be noted that the shock absorber expands and contracts due to the function of the damping force. Thus, the damping force signal indicates the expansion/contraction speed of the corresponding shock absorber, and the damping force change rate signal indicates the expansion/contraction acceleration of the corresponding shock absorber. It will be noted that the combination of the damping force detection circuit 35 and the piezoelectric load sensors 31FL, 31FR, 31RL and 31RR corresponds to the aforementioned damping force detecting unit M4 shown in FIG. 1.

Figure 8:
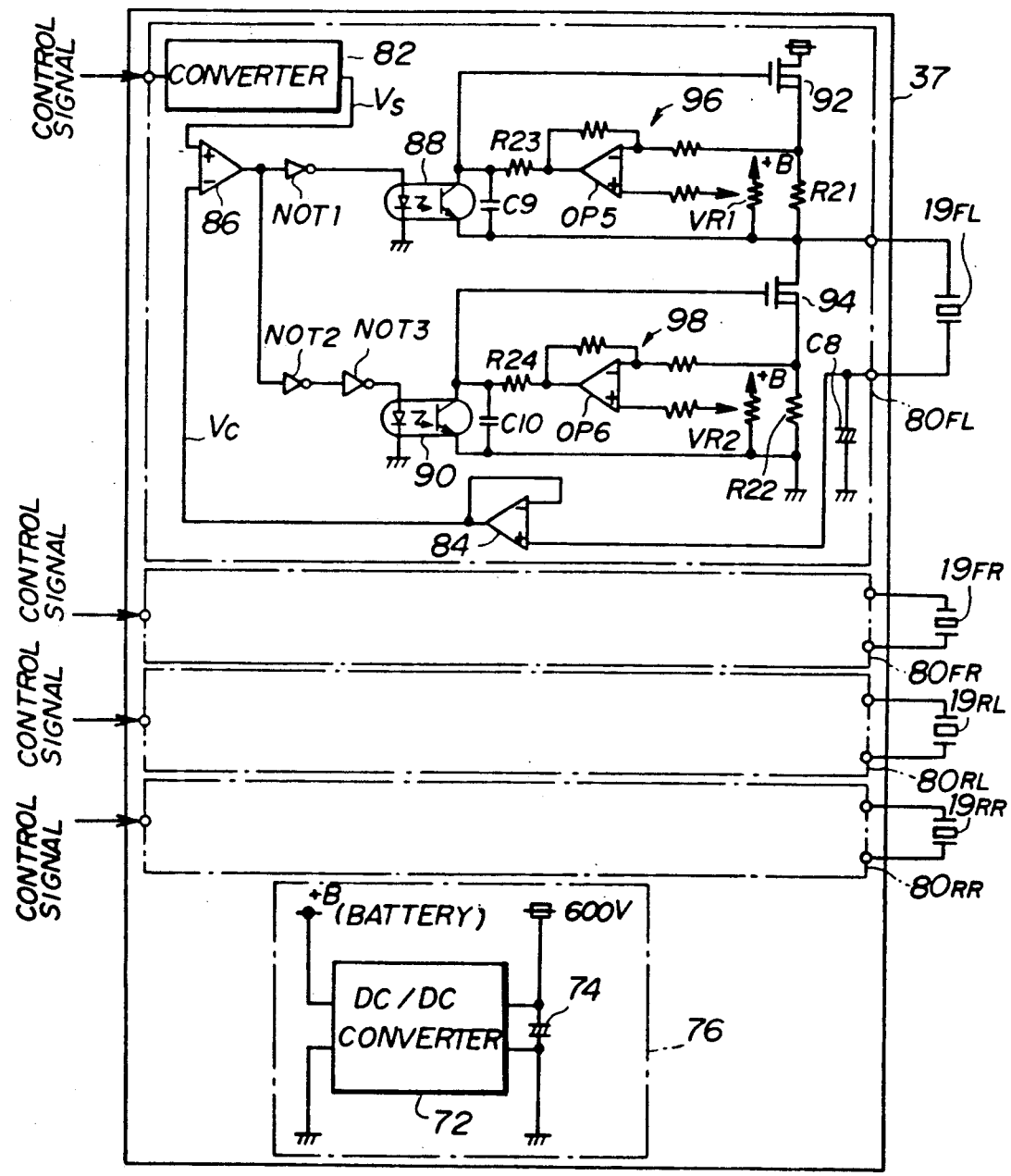
FIG. 8 is a circuit diagram of a driver circuit shown in FIG. 5.

Referring to FIG. 8, the driver circuit 37 has a high-voltage generation circuit 76, and charge control circuits 80FL, 80FR, 80RL and 80RR provided respectively for the piezoelectric actuators 19FL, 19FR, 19RL and 19RR. The high-voltage generation circuit 76 has a DC/DC converter 72, which converts a battery voltage +B into a high voltage equal to, for example, 600 volts, which is stored in a capacitor 74 coupled to an output terminal of the DC/DC converter 72. The charge control circuits 80FL, 80FR, 80RL and 80RR control the amounts of charges which are supplied to the piezoelectric actuators 19FL, 19FR, 19RL and 19RR in accordance with the control signals related to the piezoelectric actuators 19FL, 19FR, 19RL and 19RR, respectively.

A description will now be given of the charge control circuit 80FL. It will be noted that each of the other charge control circuits 80FR, 80RL and 80RR is the same as the charge control circuit 80FL. Referring to FIG. 8, the charge control circuit 80FL has a capacitor connected to the piezoelectric actuator 19FL in parallel form, and a digital-to-analog (D/A) converter 82, which converts the control signal output by the CPU 4a into a voltage signal. The capacitor C8 functions to detect the amount of the charge in the piezoelectric actuator 19FL, and has a capacitance sufficiently greater than that of the piezoelectric actuator 19FL. A voltage Vc developed across the capacitor C8 (capacitor voltage) is input to a comparator 86 via a buffer 84 formed of an operational amplifier. The comparator 86 compares the capacitor voltage Vc with an instruction voltage Vs indicating a target charge amount which is related to the piezoelectric actuator 19FL and which is output by the D/A converter 82. An output terminal of the comparator 86 is coupled to an input terminal of a photocoupler 88 via a NOT circuit NOT1, and also coupled to an input terminal of a photocoupler 90 via NOT circuits NOT2 and NOT3 connected in series. When the instruction voltage Vs is larger than the capacitor voltage Vc, the comparator 86 turns OFF the photocoupler 88 and turns ON the photocoupler 90. On the other hand, when the capacitor voltage Vc is equal to or larger than the instruction voltage Vs, the capacitor 86 turns ON the photocoupler 88 and turns OFF the photocoupler 90.

The photocoupler 88 is provided for controlling the ON and OFF states of a field effect transistor (FET) 92 which functions to supply the piezoelectric actuator 19FL with a charge. The photocoupler 90 is provided for controlling the ON and OFF states of a field effect transistor (FET) 94 which funotions to discharge the piezoelectric actuator 19FL. When the photocoupler 88 is ON, the FET 92 for charging the piezoelectric actuator 19FL is ON. On the other hand, when the photocoupler 90 is OFF, the FET 94 for discharging the piezoelectric actuator 19FL is ON.

When the FET 92 is ON, a charge current which passes through the piezoelectric actuator 19FL is controlled in such a way that a differential amplifier 96 formed of an operational amplifier OP5 controls a bias voltage applied to the gate of the FET 92 so that a voltage developed across a resistor R21 provided in a charging path is equal to a setting voltage determined by a variable resistor VR1 which divides the battery voltage +B. On the other hand, when the FET 94a is ON, a discharge current from the piezoelectric actuator 19FL is controlled in such a way that a differential amplifier 98 formed of an operational amplifier OP6 controls a bias voltage applied to the gate of the FET 94 so that a voltage developed across a resistor R22 provided in a discharging path is equal to a setting voltage determined by a variable resistor VR2 which divides the battery voltage +B.

When the capacitor voltage Vc becomes substantially equal to the instruction voltage Vs, the FETs 92 and 94 respectively turn ON and OFF at a frequency based on the characteristics of the above-mentioned charging and discharging control systems, so that the amount of the charge in the piezoelectric actuator 19FL is controlled to the target charge amount determined by the CPU 4a. It will be noted that a resistor R23 and a capacitor C9 function to cause the FET 92 to turn ON with a delay of time, so that the stability of the charging control system can be improved and the power consumption obtained when the charge amount has become equal to the target charge amount can be reduced. Similarly, a resistor R24 and a capacitor C10 function to cause the FET 94 to turn ON with a delay of time, so that the stability of the discharging control system can be improved and the power consumption obtained when the charge amount has become equal to the target charge amount can be reduced.

Figure 9B:
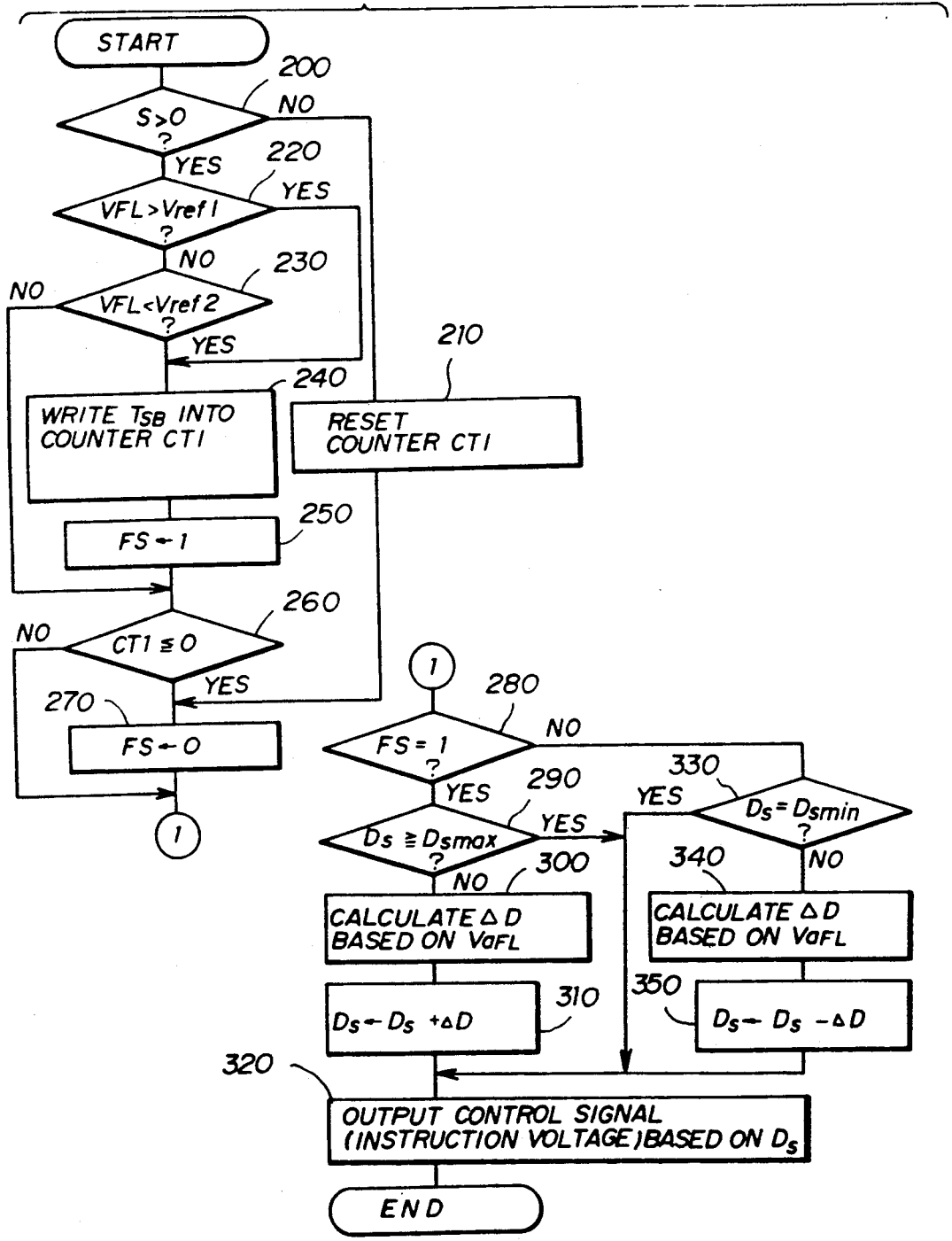

A description will now be given of a damping force alteration control executed by the CPU 4a. FIGS. 9A and 9B illustrate a damping force alteration procedure which controls the shock absorbers 2FL, 2FR, 2RL and 2RR respectively having the two damping force setting levels and which is repeatedly carried out by the CPU 4a.

Figure 10:
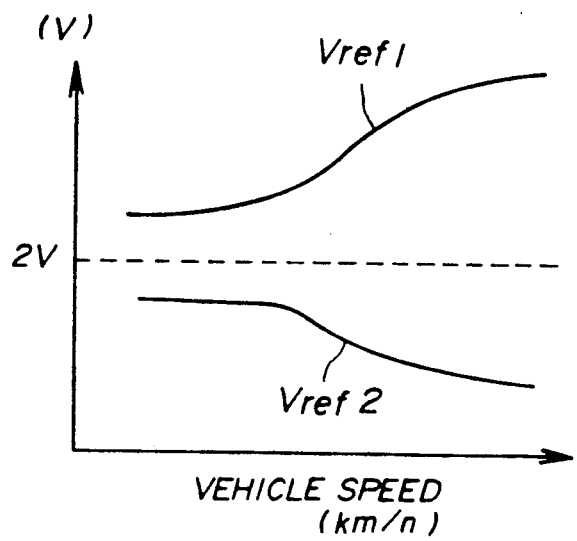
FIG. 10 is a graph showing the relationship between the vehicle speed and an upper limit value Vref1 used for judging whether or not the road surface is rough as well as the relationship between the vehicle speed and a lower limit value Vref2 used for the same purpose.

Referring to FIG. 9A, at step 100, the CPU 4a carries out an initialization procedure in which flags and counters, which will be described later, are initialized. At step 110, the CPU 4a calculates the speed (labeled S) of the vehicle traveling from the detection signal output by the vehicle speed sensor 3. At step 120, the CPU 4a reads the damping force change rate signals $V_{FL}$, $V_{FR}$, $V_{RL}$ and $V_{RR}$ which are respectively related to the shock absorbers 2FL, 2FR, 2RL and 2RR and which are output by the damping force detection circuit 35 (FIG. 6). At step 130, the CPU 4a reads the damping force signals $V_{aFL}$, $V_{aFR}$, $V_{aRL}$ and $V_{aRR}$ which are respectively related to the shock absorbers 2FL, 2FR, 2RL and 2RR and which are output by the damping force detection circuit 35. At step 140, the CPU 4a determines an upper limit value Vref1 of the damping force change rate signal based on the vehicle speed S by using a map which is stored in the ROM 4b (FIG. 5) and which shows the relationship between the vehicle speed S and the upper limit value Vref1, as shown in FIG. 10. Also, at step 140, the CPU 4a determines a lower limit value Vref2 of the damping force change rate signal based on the vehicle speed by the map which also shows the relationship between the vehicle speed S and the lower limit value Vref2 shown in FIG. 10. The upper and lower limit values Vref1 and Vref2 function as threshold values for judging whether or not the road surface is rough on the basis of the damping force change rate signal. At steps 150, 160, 170 and 180, the CPU 4a respectively carries out a damping force alteration control to the shock absorbers 2FL, 2FR, 2RL and 2RR on the basis of the upper and lower limit values Vref1 and Vref2. After step 180 is executed, the CPU 4a carries out step 110 again.

The damping force alteration control is separately carried out at steps 150, 160, 170 and 180, as shown in FIG. 9B. For the sake of simplicity, FIG. 9B illustrates the damping force alteration control which is carried out for the left front wheel 5FL. At step 200, the CPU 4a determines whether the vehicle speed 8 is greater than zero (S>0). When it is determined that the vehicle is not traveling, the CPU 4a executes step 210 at which step a time counter CT1 is reset. Then, the CPU 4a executes step 270.

On the other hand, when it is determined, at step 200, that the vehicle is traveling, the CPU 4a executes step 220 at which step it is determined whether or not the damping force change rate signal $V_{FL}$ read at step 120 (FIG. 9A) is greater than the upper limit value Vref1 thereof which is determined at step 140 (FIG. 9A). When it is determined, at step 220, that $V_{FL} \leq V ref1$, the CPU 4a executes step 230 at which step it is determined whether or not the damping force change rate signal $V_{FL}$ is smaller than the lower limit value Vref2 thereof which is determined at step 140. It will be noted that the procedure of the steps 220 and 230 detects a roughness of the road surface by determining whether or not the damping force change rate signal $V_{FL}$ falls in the range defined by the lower limit value Vref2 and the upper limit value Vref1, and corresponds to the road surface condition detecting unit M2 shown in FIG. 1.

Figure 11:
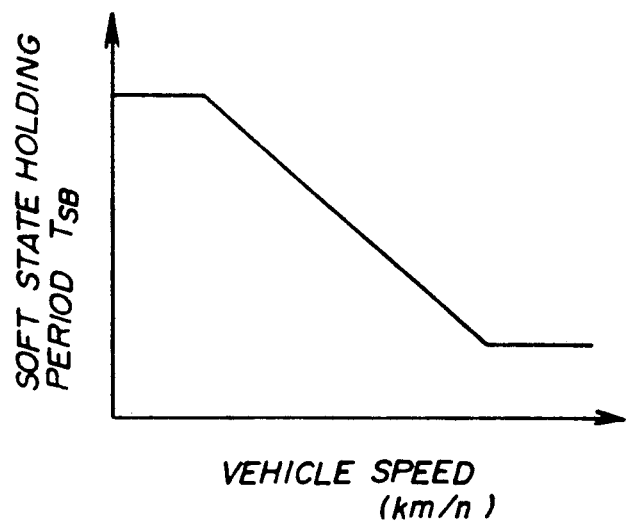
FIG. 11 is a graph illustrating the relationship between a soft state holding period and the vehicle speed.

When it is determined, at step 220, that $V_{FL} > Vref1$, or it is determined, at step 230, that $V_{FL} < Vref2$, the CPU 4a concludes that the road surface is rough, and proceeds to step 240. At step 240, the CPU 4a writes a soft state holding period $T_{SB}$ into the time counter CT1 by using a map shown in FIG. 11, which defines the relationship between the soft state holding period $T_{SB}$ and the vehicle speed S (km/n). As shown in FIG. 11, the soft state holding period $T_{SB}$ is a function of the vehicle speed S and decreases as the vehicle speed S increases. The time counter CT1 is a down counter which counts down the soft state holding period $T_{SB}$ until it indicates zero. At step 250 subsequent to step 240, the CPU 4a sets a flag FS to 1. The flag FS equal to 1 shows that the setting of the damping force of the shock absorber 2FL should be altered to the low level (soft state).

After the flag FS is set to 1 at step 250, or it is determined, at step 230, that $V_{FL} \geq Vref2$, the CPU 4a executes step 260 at which step it is determined whether or not CT1≦0. As has been described above, the soft state holding period $T_{SB}$ is set to 1 when the damping force change rate signal $V_{FL}$ is outside of the range between the upper limit value Vref1 and the lower limit value Vref2. Thus, the value in the timer counter CT1 is counted down when the damping force change rate signal $V_{FL}$ is within the range between Vref1 and Vref2. As a result, step 260 judges whether or not state where the damping force change rate signal $V_{FL}$ is within the range defined by the upper limit value Vref1 and the lower limit value Vref2, is continuously obtained during the soft state holding period $T_{SB}$.

When it is determined, at step 260, that the count value in the timer counter CT1 is equal to or smaller than zero, the CPU 4a executes step 270 at which step the flag FS is reset to zero. The flag FS equal to zero indicates that the setting of the damping force of the shock absorber 2FL should be altered (returned) to the high level (hard state).

At step 280 subsequent to step 270, the CPU 4a determines whether or not the setting of the damping force should be altered to the soft state by determining whether or not the flag FS is equal to 1. When it is determined, at step 280, that the setting of the damping force should be altered to the soft state (FS=1), the CPU 4a executes step 290 at which step a target charge amount Ds for the piezoelectric actuator 19FL is equal to or greater than a maximum charge amount Dsmax. In other words, step 290 judges whether or not the setting of the damping force of the shock absorber 2FL has been altered to the soft state.

When it is determined, at step 290, that the target charge amount Ds is less than the maximum charge amount Dsmax, the CPU 4a executes step 300 at which step the CPU 4a calculates a charge variation amount ΔD necessary to alter the setting of the damping force of the shock absorber 2FL, by using a map which shows th e relationship between the charge variation amount ΔD and the damping force signal $V_{aFL}$ shown in FIG.

Figure 12:
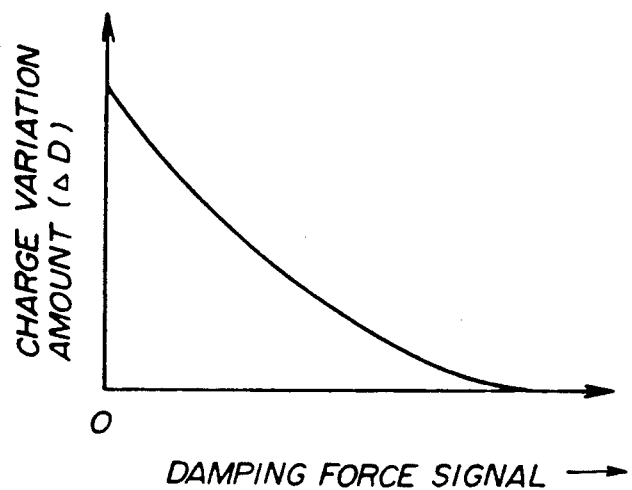
FIG. 12 is a graph illustrating the relationship between a charge variation amount and a damping force signal.

12. As shown in FIG. 12, the charge variation amount $\Delta D$ decreases as the damping force signal $V_{aFL}$ increases. At step 310, the CPU 4a adds the charge variation amount $\Delta D$ to the target charge amount DS, so that the target charge amount Ds is revised. Then, the CPU 4a executes step 320.

On the other hand, when it is determined, at step 280, that the flag FS is not equal to 1 (Which means that the setting of the damping force of the shock absorber 2FL should be maintained in the hard state), the CPU 4a carries out step 330, at which step it is determined the target charge amount Ds of the piezoelectric actuator 19FL is equal to the minimum charge amount Dsmin. In other words, step 330 determines whether or not the setting of the damping force of the shock absorber 2FL has been altered to the hard state.

When it is determined, at step 330, that Ds is not equal to Dsmin, the CPU 4a calculates the charge variation amount $\Delta D$ on the basis of the damping force signal $V_{aFL}$ by referring to the map showing the relationship shown in FIG. 12 in the same way as at step 300. At step 350, the CPU 4a subtracts the charge variation amount $\Delta D$ obtained at step 340 from the target charge amount Ds, so that the target charge amount Ds is revised. Then, the CPU 4a executes step 320. When it is determined, at step 290, that Ds $\geq$ Dsmax, the CPU 4a also executes step 320. At step 320, the CPU 4a outputs the control signal based on the current target charge amount Ds to the charge control circuit 80FL (FIG. 8) of the driver circuit 37. Then, the CPU 4a ends the procedure shown in FIG. 9B.

Figure 7:
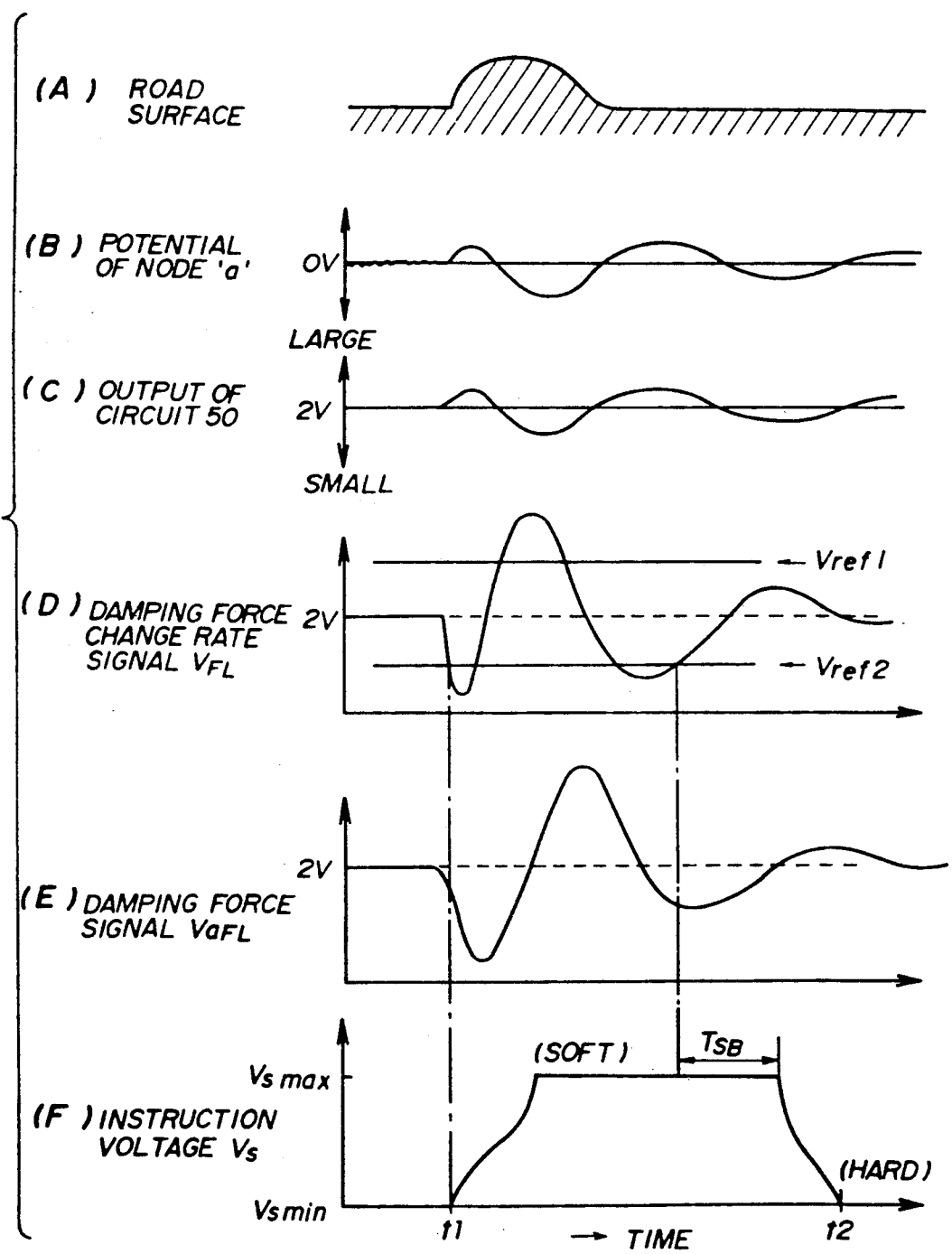
FIG. 7 is a timing chart illustrating the operation of the damping force detection circuit shown in FIG. 6 and a damping force alteration control.

Referring to FIG. 7, the left front wheel 5FL starts to run on the projection on the road surface, and the expansion/contraction acceleration of the shock absorber 2FL increases. At time $t_1$, the level (amplitude) of the damping force change rate signal $V_{FL}$ becomes lower than the lower limit value Vref2. At this time, the CPU 4a concludes that the vehicle is traveling on a rough road surface which increases the vibration of the vehicle body 7 and which deteriorates riding comfort. Thus, at time $t_1$, the setting of the damping force of the shock absorber 2FL is altered to the soft state from the hard state. When the damping force change rate signal $V_{FL}$ has been maintained in the range defined by the upper limit value Vref1 and the lower limit value Vref2 during the soft state holding period $T_{SB}$, the setting of the damping force of the shock absorber 2FL is altered (returned) to the hard state from the soft state (approximately time $t_2$).

As has been described previously, the setting of the damping force is altered by referring to the map which is stored in the ROM 4b (FIG. 5) and which represents the relationship shown in FIG. 12. More specifically, the charge variation amount $\Delta D$ is calculated by using the map, and the target charge amount Ds is revised toward the soft state side (Dmax side) or the hard state side (Dmin side). Since the charge variation amount $\Delta D$ decreases as the damping force signal increases, the target charge amount Ds is changed more greatly toward the Dmax side or Dmin side as the damping force of the shock absorber 2FL decreases. With the above arrangement, the instruction voltage Vs shown in FIG. 7(F) which controls the amount of the charge in the piezoelectric actuator 19FL changes more slowly toward the Vsmax (soft) side or Vsmin (hard) side as the damping force signal $V_{aFL}$ increases, and changes more rapidly as the damping force signal $V_{aFL}$ decreases. It will be noted that the procedure consisting of the steps 280-350 shown in FIG. 9B corresponds to the aforementioned damping force characteristic alteration unit M3 and the alteration speed control unit M5 shown in FIG. 1.

According to the above-mentioned embodiment of the present invention, it becomes possible to change the alteration speed of the setting (characteristic) of the damping force of each shock absorber in accordance with the magnitude of the damping force, more specifically to decrease the alteration speed as the damping force increases. With this arrangement, it becomes possible to prevent the occurrence of a shock which takes place when the setting of the damping force can be altered rapidly in the state where the damping force is great. On the other hand, when the damping force is small, the setting of the damping force can be altered rapidly. As a result, the damping force alteration control according to the embodiment of the present invention has a good response characteristic.

In the above-mentioned embodiment of the present invention, the damping force of each shock absorber is detected by means of the piezoelectric load sensor. Alternatively, it is possible to employ a stroke sensor which is conventionally used for controlling a vehicle height, since the damping force corresponds to the expansion/contraction speed of the shock absorber. It is also possible to use the stroke sensor to detect the roughness of the road surface. It is also possible to directly detect the road surface condition by using an ultrasonic sensor.

In the aforementioned embodiment of the present invention, the upper and lower limit values Vref1 and Vref2 are determined based on the vehicle speed S by referring to the map shown in FIG. 11. In addition, it is possible to correct the upper and lower limit values Vref1 and Vref2 on the basis of the accelerating state of the vehicle, turn angle and/or brake stepping state. While the vehicle is traveling under any of the above driving conditions, the vehicle body is tilted forward, backward, leftward or rightward. If the setting of the damping force is altered to the soft state under any of the above conditions, the stability of the vehicle will deteriorate. For example, when any of the conditions is detected, the upper and lower limit values Vref1 and Vref2 are increased.

Figure 13:
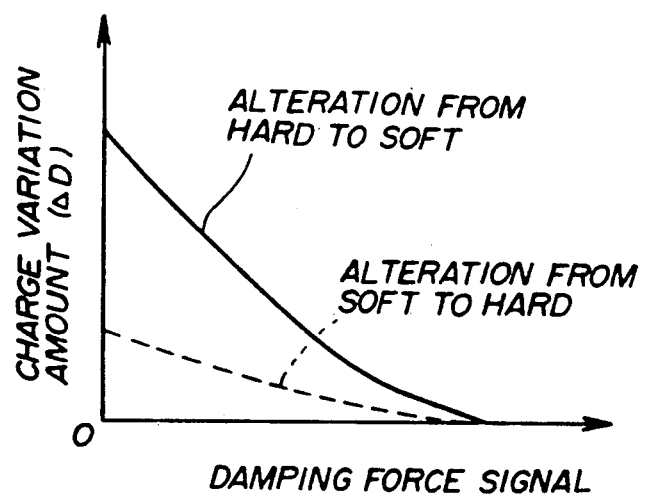
FIG. 13 is a graph illustrating another relationship between the charge variation amount and the damping force signal.

In the aforementioned embodiment of the present invention, the alteration from the soft state to the hard state is carried out by using the same map shown in FIG. 12 as the alteration from the hard state to the soft state. It should be noted that riding comfort and driving controllability and stability is less affected even when the setting of the damping force is slowly returned to the hard state from the soft state. With the above in mind, as shown in FIG. 13, it is possible to two maps respectively provided for the hard-to-soft alteration and the soft-to-hard alteration. More specifically, a curve depicted by the broken line indicates the charge variation amount $\Delta D$ when the setting of the damping force is returned to the hard state from the soft state. A curve depicted by the solid line indicates the charge variation amount $\Delta D$ when the setting of the damping force is altered to the soft state from the hard state. The alteration speed which is set when the setting of the damping force is returned to the soft state, is smaller than that which is set when the setting of the damping force is altered to the hard state. It is also possible to alter the setting of the damping force from the soft state to the hard state at a constant speed which does not cause a shock.

The present invention is not limited to the specifically disclosed embodiments, and variations and modifications may be made without departing from the scope of the present invention.

What is claimed is:

1. An apparatus for controlling a damping force of a shock absorber provided between a wheel of a vehicle and a body thereof, said shock absorber having at least two different characteristics of the damping force, said apparatus comprising:

road surface condition detecting means for detecting roughness of a road surface on which the vehicle is traveling;

damping force characteristic alteration means, coupled to said road surface condition detecting means, for altering the setting of the damping force of the shock absorber on the basis of the roughness of the road surface detected by said road surface condition detecting means;

damping force detecting means, coupled to said shock absorber, for detecting a magnitude of the damping force of the shock absorber; and alteration speed control means, coupled to said damping force characteristic alteration means and said damping force detecting means, for controlling, on the basis of the magnitude of the damping force detected by said damping force detecting means, an alteration speed at which the setting of the damping force is altered so that the alteration speed decreases as the magnitude of the damping force increases.

2. An apparatus as claimed in claim 1, wherein:

said apparatus further comprises memory means for storing a map which defines a relationship in which the alteration speed decreases as the magnitude of the damping force increases; and said alteration speed control means comprises means for determining the alteration speed corresponding to the magnitude of the damping force detected by said damping force detecting means by referring to said map stored in said memory means.

3. An apparatus as claimed in claim 1, wherein:

said shock absorber comprises a piezoelectric actuator which causes said shock absorber to be switched between said two different characteristics of the damping force;

said damping force characteristic alteration means comprises control means for controlling an amount of a charge stored in said piezoelectric actuator on the basis of the magnitude of the damping force detected by said damping force detecting means; and said alteration speed is based on the amount of the charge stored in said piezoelectric actuator.

4. An apparatus as claimed in claim 3, wherein:

said apparatus further comprises memory means for storing a map which defines a relationship in which a charge variation amount decreases as the magnitude of the damping force increases; and said alteration speed control means comprises means for charging the amount of the charge stored in said piezoelectric actuator by said charge variation amount corresponding to the magnitude of the damping force detected by said damping force detecting means by referring to said map stored in said memory means, so that the alteration speed decreases as the magnitude of the damping force increases.

5. An apparatus as claimed in claim 3, wherein:

said at least two different characteristics of the damping force comprise a first setting level of the damping force at which the shock absorber is maintained in a hard state and a second setting level of the damping force at which the shock absorber is maintained in a soft state; and said apparatus further comprises judging means for judging whether the damping force should be set to said first setting level or said second setting level, and wherein said control means comprises:

first means for increasing the charge to be stored in said piezoelectric actuator by said charge variation amount which decreases as the magnitude of the damping force detected by said damping force detecting means increases when said judging means judges that the damping force of the shock absorber should be set to said second setting level; and second means for decreasing the charge to be stored in said piezoelectric actuator by said charge variation amount which decreases as the magnitude of the damping force detected by said damping force detecting means increases when said judging means judges that the damping force of the shock absorber should be set to said first setting level.

6. An apparatus as claimed in claim 3, wherein:

said two different characteristics of the damping force comprise a first setting level of the damping force at which the shock absorber is maintained in a hard state and a second setting level of the damping force at which the shock absorber is maintained in a soft state, wherein said apparatus further comprises:

charge amount detecting means for detecting the amount of the charge stored in said piezoelectric actuator; and first determining means for determining whether or not the amount of the charge detected by said charge amount detecting means is equal to or greater than a first predetermined charge amount which causes the shock absorber to be maintained in the soft state, and wherein said control means comprises first means for increasing the charge to be stored in said piezoelectric actuator by a charge variation amount which decreases as the magnitude of the damping force detected by said damping force detecting means increases when said first determining means determines that the amount of the charge detected by the charge amount detecting means is less than said first predetermined charge amount.

7. An apparatus as claimed in claim 6, wherein:

said apparatus comprises second determining means for determining whether or not the amount of the charge detected by said charge amount detecting means is equal to a second predetermined charge amount which causes the shock absorber to be maintained in the hard state; and said control means comprises second means for decreasing the charge in said piezoelectric actuator by said charge variation amount which decreases as the magnitude of the damping force detected by said damping force detecting means increases when said second determining means determines that the amount of the charge detected by said charge amount detecting means is not equal to said second predetermined charge amount.

8. An apparatus as claimed in claim 7, wherein:
said apparatus further comprises memory means for storing a map which defines a relationship in which said charge variation amount decreases as the magnitude of the damping force increases;
said control means comprises reading means for reading the charge variation amount corresponding to the magnitude of the damping force detected by said damping force detecting means from said memory means; and
said first means and said control means use said charge variation amount read by said reading means.

9. An apparatus as claimed in claim 7, wherein:
said apparatus further comprises memory means for storing a first map which defines a first relationship in which the charge variation amount decreases as the magnitude of the damping force increases, and a second map which defines a second relationship in which the charge variation amount decreases as the magnitude of the damping force increases;
said control means comprises reading means for reading the charge variation amount corresponding to the magnitude of the damping force detected by said damping force detecting means from said first map stored in said memory means when said first determining means determines that the amount of the charge is less than said first predetermined charge amount and for reading the charge variation amount corresponding to the magnitude of the damping force detected by said damping force detecting means from said second map stored in said memory means when said second determining means determines that the amount of the charge is not equal to said second predetermined charge amount.

10. An apparatus as claimed in claim 9, wherein:
said first relationship defined in said first map shows that the alteration speed decreases at a first speed as the magnitude of the damping force increases;
said second relationship defined in said second map shows that the alteration speed decreases at a second speed as the magnitude of the damping force increases; and
said first speed and said second speed are different from each other.

11. An apparatus as claimed in claim 10, wherein said first speed is greater than said second speed.

12. An apparatus as claimed in claim 1, wherein:
said road surface condition detecting means comprises damping force change rate detecting means for detecting a damping force change rate which indicates the rate of change of the damping force;
said damping force characteristic alteration means comprises discerning means for discerning whether or not said damping force change rate detected by said damping force change rate detecting means is outside of a predetermined range; and
when said discerning means discerns that said damping force change rate is outside of said predetermined range, said damping force characteristic alteration means alters the setting of the damping force so that the shock absorber is set to a soft state from a hard state, said soft state and said hard state corresponding to said at least two different characteristics of the damping force.

13. An apparatus as claimed in claim 12, wherein said apparatus further comprises soft state holding means for maintaining said shock absorber in said soft state during a predetermined soft state holding period immediately after said damping force change rate becomes outside of said predetermined range.

14. An apparatus as claimed in claim 13, wherein said apparatus further comprises:
vehicle speed detecting means for detecting a speed of said vehicle; and
adjusting means for adjusting said soft state holding period on the basis of the speed of said vehicle so that the soft state holding period decreases as the speed of said vehicle detected by said vehicle speed detecting means increases.

15. An apparatus as claimed in claim 13, wherein said apparatus further comprises:
vehicle speed detecting means for detecting a speed of said vehicle; and
adjusting means for adjusting said predetermined range on the basis of the speed of said vehicle so that said predetermined range becomes wider as the speed of said vehicle detected by said vehicle speed detecting means increases.

16. An apparatus as claimed in claim 13, wherein said discerning means of said damping force characteristic alteration means comprises means for determining whether or not said damping force change rate detected by said damping force change rate detecting means is continuously maintained in said predetermined range and for returning the shock absorber to said hard state from said soft state when it is determined that said damping force change rate is continuously maintained in said predetermined range.

* * * * *